United States Patent [19]

Christianson

[11] Patent Number: 5,003,180

[45] Date of Patent: Mar. 26, 1991

[54] METHOD OF RECYCLING DOSIMETERS

[75] Inventor: Charles L. Christianson, Rockville, Md.

[73] Assignee: The United States of America as represented by the Secretary of the Navy, Washington, D.C.

[21] Appl. No.: 511,127

[22] Filed: Apr. 19, 1990

[51] Int. Cl.[5] .............................................. G01T 1/02
[52] U.S. Cl. ................................................. 250/484.1
[58] Field of Search .................. 250/484.1 C, 484.1 R

[56] References Cited

U.S. PATENT DOCUMENTS

| 3,793,527 | 2/1974 | Forest | 250/459.1 |
| 4,333,013 | 6/1982 | Burgkhardt et al. | 250/461.1 |
| 4,802,762 | 2/1989 | Hill, Jr. | 356/318 |

OTHER PUBLICATIONS

James B. Schulman, William Shurcliff, Robert J. Ginther and Frank M. Attix, "Radiophotoluminescence Dosimetry System of the U.S. Navy." Nucleonics, vol. 11, No. 10 (Oct., 1953) pp. 52–56.

Primary Examiner—Constantine Hannaher
Attorney, Agent, or Firm—Kenneth E. Walden; Jacob Shuster

[57] ABSTRACT

Personnel dosimeters are salvaged after use or prolonged storage by dividing batches thereof into separate groups on the visually observable degradation of radiation sensing surfaces thereon. The groups are reconditioned by different treatments to respectively correct for surface degradation and the effects of prior radiation exposure. A small fraction of the dosimeters withdrawn from the group treated for removal of the effects of prior radiation exposure, undergo gamma irradiation and measurement of resulting emissions to calculate correction factor assigned to the reconditioned dosimeters to compensate for reduced sensitivity.

25 Claims, 3 Drawing Sheets

METHOD OF RECYCLING DOSIMETERS

BACKGROUND OF THE INVENTION

This invention relates to the salvaging of used and or defective dosimeters for subsequent reliable use.

Dosimeters are now often discarded after extended use by personnel or exposure to significant doses of gamma radiation. Such personnel dosimeters also become damaged and unreliable after long storage periods so as to provide distorted readings varying between zero and excessively high dose reading values following either no exposure to gamma radiation or moderate exposure. Presently available procedures of pre-dose screening and/or light detergent washing of the dosimeters inadequately deal with such reading reliability problems.

In so far as prolonged storage is concerned, dosimeter damage often occurs as a result of humid environmental conditions. Moisture condensation on the exposed faces of the dosimeter sensing elements causes chemical and physical changes. Thus, surface projection growths and pitting occurs as a result of such chemical changes to optically affect the sensing operation of the dosimeters after ultra-violet irradiation to induce emissions indicative of prior exposure to gamma radiation. Distortion of readings indicative of such gamma radiation exposure accordingly results from the referred to humidity caused surface degradation damage.

The evaluation of dosimeters, having sensing elements of the phosphate glass type, to avoid reading errors is already generally known, as referred to for example in U.S. Pat. No. 4,333,013 to Burgkhardt et al. The use of ultra-violet radiation for inducing luminescent emissions by excitation of phosphors, is also known as disclosed for example in U.S. Pat. No. 3,793,527 to Forest while the visual inspection of luminescent materials for observance of surface degradation following exposure to radiation is referred to for example in U.S. Pat. No. 4,802,762 to Hill, Jr. However, the prior art referred to in the latter U.S. patents does not deal with the correction of error producing changes in the sensing elements of dosimeters such as those of the phosphate glass type referred to in the Burgkhardt et al. patent, aforementioned.

It is therefore an important object of the present invention to avoid the periodic discarding of large numbers of personnel dosimeters of the foregoing type, heretofore deemed to be unsalvagable.

Yet another object of the present invention, in accordance with the foregoing object, is to provide for the repair and refurbishment of defective dosimeters made unreliable or useless by prior radiation exposures and/or prolonged storage under humid conditions.

SUMMARY OF THE INVENTION

In accordance with the present invention, a batch of dosimeters are visually inspected to separate out a first group of dosimeters having sensing elements with observable surface degradation. Such first group of dosimeters are reconditioned by sequential dismounting of the sensing elements, which then undergo a series of treatment steps including washing, cleaning, etching with acid and/or abrading of the sensing faces to flatness, rinsing, drying, applying moisture sealant and reassembly of the sensing elements with their dosimeter mountings. A second group of the batch of visually inspected dosimeters, having no observable surface degradation, undergo ultra-violet irradiation to induce luminescent emissions for evaluation purposes. By measurement of emission intensity, the second group of dosimeters having above normal base readings are withdrawn for continued treatment. The treatment for the second group of dosimeters differs from that of the first group in that the dismounted and washed sensing elements are heated and annealed instead of being abraded before moisture sealing and reassembly. The treated dosimeters of the second group after reassembly are measured for residual exposure radiation and those having less than a standard residual dose reading rejoin the treated dosimeters of the first group to terminate reconditioning operations for the processed batch.

A small fraction of the dosimeters in the processed batch are withdrawn from the second group of reassembled dosimeters for irradiation by gamma rays to obtain exposure dosage readings from which a correction factor is calculated. Such calculated correction factor is assigned to the second group of dosimeters as aforementioned to compensate for reduced sensitivity.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
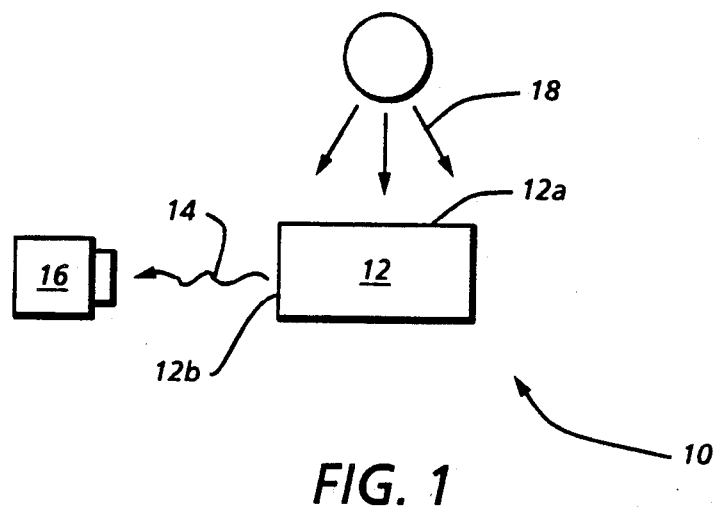
FIG. 1 is a schematic illustration showing the reading of emissions from a dosimeter, induced by ultra-violet irradiation.

Referring now to the drawing in detail, FIG. 1 schematically depicts a typical casualty personnel dosimeter 10, such as a silver activated phosphate glass type of radiac detector. Dosimeters of the foregoing type are worn about the neck as a pendant and have a sensing body 12 made of radiophotoluminescent glass. Under excitation by near ultra-violet radiation 18, such glass body 12 emits luminescent orange light 14, the intensity of which is measured by a reader 16 after earlier exposure of the dosimeter to gamma radiation. Such dosimeters are intended for use in nuclear radiation fallout fields characterized by gamma radiation. Toward that end, the dosimeters 10 have an exposure dosage range of accumulated gamma radiation of 0 to 600 Roentgens.

When the dosimeters 10 are initially manufactured, the top and front surfaces or faces 12a and 12b of the sensing body 12 are optically clear and completely transparent, having no air bubbles or other light distorting or light attenuating characteristics to affect the intensity measurement of emissions 14 by reader 16. Prolonged exposure of the dosimeters to humidity in tropical climates, for example, or in non-environmentally controlled storage will produce different degrees of surface degradation caused by chemical leaching out of salts into the exposure faces 12a and 12b of the sensing bodies 12 as salt mound growths and craters. Such degradation exhibits dendritic growth followed by mottling and pitting of the entire sensing surface with an overall graying effect in so far as physical appearance is concerned.

Figure 2:
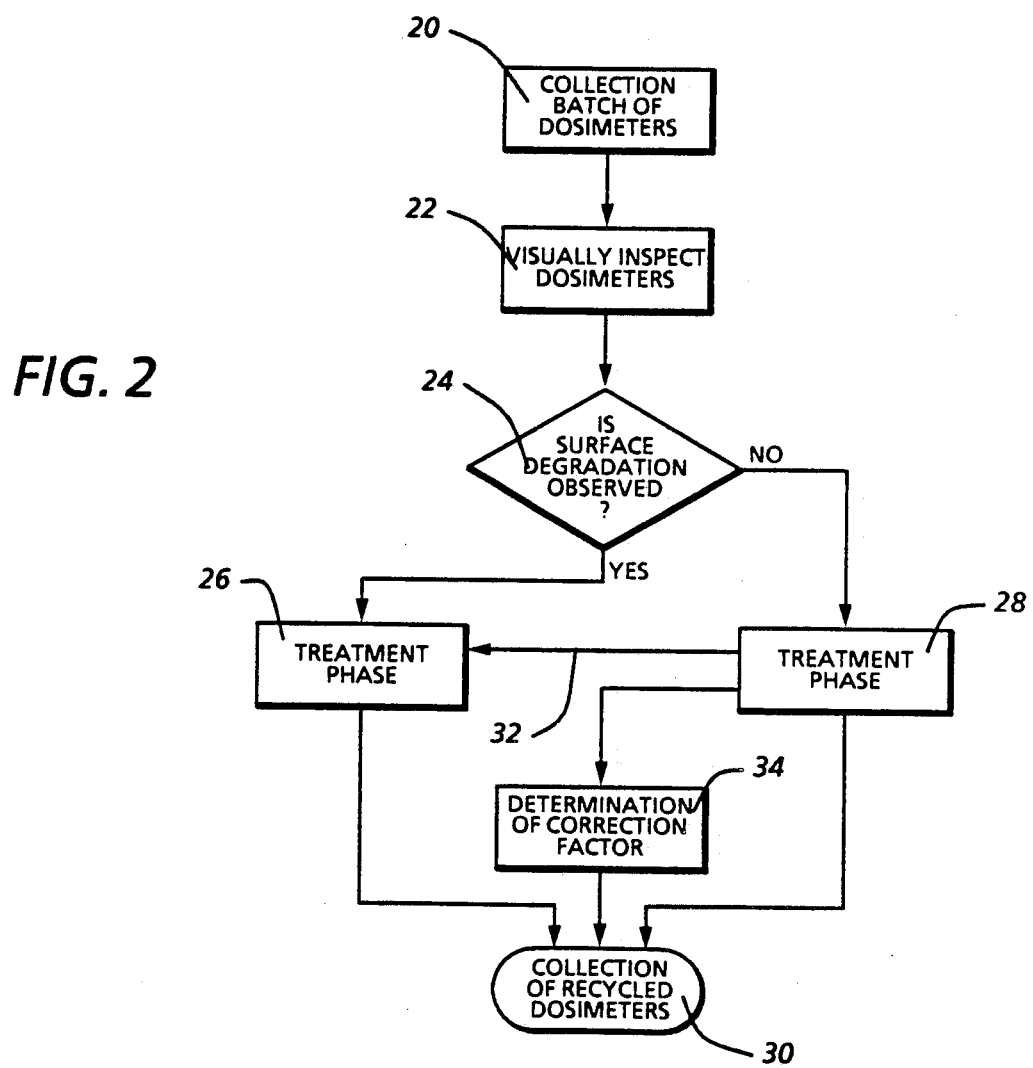
FIG. 2 is a flow chart diagram of the dosimeter recycling method. of the present invention.

In accordance with the present invention, a predetermined number or batch of dosimeters are collected for servicing as diagrammed at block 20 in FIG. 2. Initially, the entire batch of dosimeters are visually inspected as indicated at diagram block 22 to detect observable physical degradation of their exposure surfaces. If surface degradation is observed as denoted at decision block 24, those dosimeters exhibiting physical surface degradation are separated out into a first group of dosimeters to undergo a treatment procedure denoted at 26 while the second remaining group undergoes another treatment procedure 28. Upon completion of treatment 26, the dosimeters of the first group are collected at 30. Some of the dosimeters during treatment 28 are transferred, as indicated by transfer line 32, denoted in FIG. 2, to the treatment procedure 26 while a fraction of the second group of treated dosimeters are utilized to determine a correction factor as indicated at diagram block 34. The treated dosimeters of the second group are also collected at 30 as diagrammed in FIG. 2.

Figure 2A:
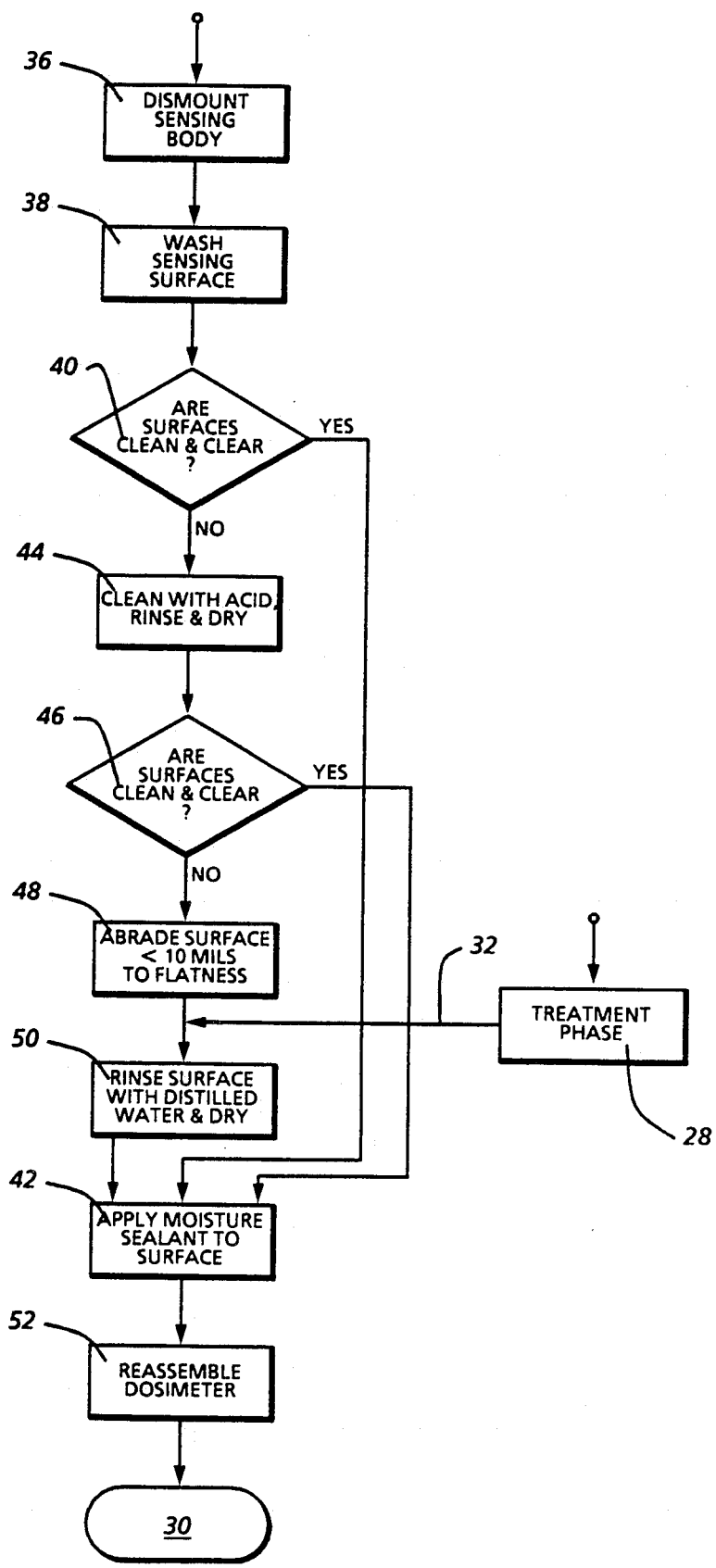
FIGS. 2A and 2B are flow chart diagrams illustrating portions of the method in greater detail.

Referring now to FIG. 2A, diagramming the steps of the treatment procedure 26, the glass sensing body 12 of each dosimeter of a first separated group of dosimeters is dismounted as indicated at 36 and the surfaces 12a and 12b thereof are washed as indicated at 38 by application of mild soapy detergent followed by rinsing with distilled water. The washed sensing surfaces are then visually inspected and if determined to be clean and clear as denoted in decision block 40 of FIG. 2A, moisture sealant is applied thereto as indicated at 42. Otherwise, the sensing bodies having surfaces exhibiting remaining contamination are extracted from the first group and have a thin film of acid, such as HCL or glass dissolvent, applied to the surfaces thereof for removal of the contaminants followed by rinsing and drying as indicated at 44. If the surfaces of such extracted sensing bodies then appear to be clean and clear from inspection as denoted in decision block 46, they are moisture sealed as indicated at the aforementioned diagram block 42. The sealant is of a type to prevent recurrence of surface degradation due to humidity without affecting surface transparency to ultra-violet and/or orange light.

Those washed sensing surfaces which remain contaminated or continue to show evidence of degradation after undergoing the process steps indicated at 44 of FIG. 2A, are abraded as indicated at 48 by sanding or grinding to flatness, limited to removal of less than 10 mils of surface material. Grinding to flatness may be performed by initial use of coarse sanding paper followed by medium paper and then fine grit to achieve a fine polish with an attendant optical finish to correct the aforementioned physical degradation of the sensing surfaces 12a and 12b. As indicated at block 50, the abraded surfaces as well as the sensing surfaces of dosimeters transferred during treatment procedure 28 are washed by rinsing with distilled water and drying before moisture sealant is applied at 42. After the moisture sealant is applied to the surfaces 12a and 12b of the sensing bodies at 32, as hereinbefore described, the bodies are then reassembled onto the mountings of their dosimeters as indicated at 52 to complete servicing by the treatment procedure 26 limited to the first group of the dosimeters.

Figure 2B:
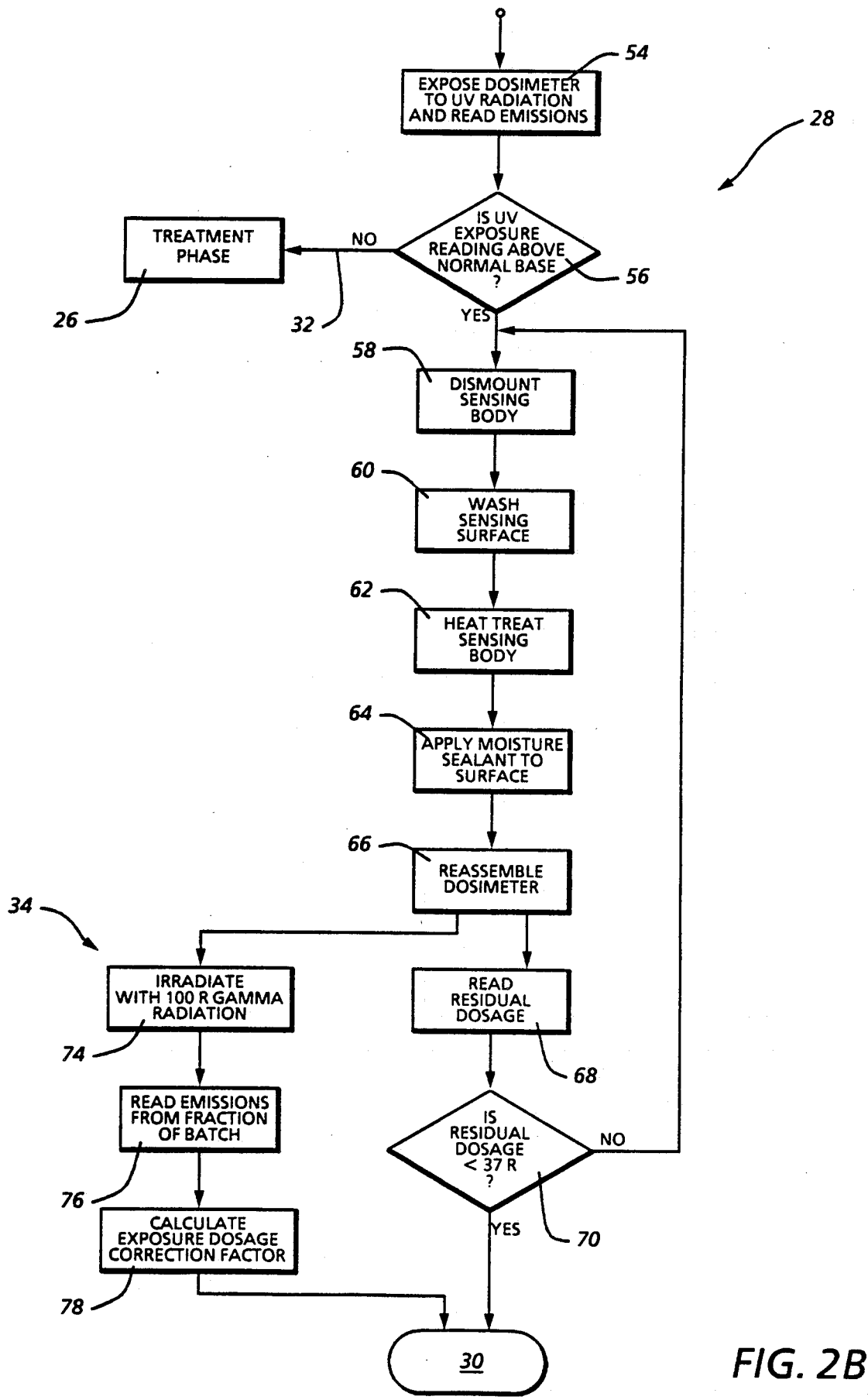

Those dosimeters of the batch which do not exhibit visually observable surface degradation as indicated at block 24 of FIG. 2 undergo ultra-violet irradiation to induce the emission of orange light therefrom which is measured for intensity as indicated at block 54 of FIG. 2B. If there is a significant deviation in emission intensity from a normal base reading of less than 37 Roentgens ($9.5 \times 10^{-3}$c/kg) as reflected at block 56, those dosimeters exhibiting such high emission reading are separated out as a second group for continued treatment while the others are transferred to the first group undergoing treatment procedure 26 as indicated by line 32. The dosimeters of the second group then have their sensing bodies dismounted and the exposure surfaces thereof are washed as respectively indicated by blocks 58 and 60 in FIG. 2B, in a manner as hereinbefore described with respect to the servicing of the dosimeters of the first group as denoted at blocks 36 and 38 of FIG. 2A. The dismounted sensing bodies and their washed surfaces of the dosimeters in the second group then undergo a heat treatment as denoted at block 62 to erase any dose reading. The heat treated surfaces are then moisture sealed as denoted at block 64 before reassembly of the sensing bodies 12 on their dosimeter mountings as indicated at block 66. The oven drying heat treatment indicated at block 62 involves placement of the sensing bodies into a moisture-free, gaseous environment formed by dry air or nitrogen within a laboratory oven, for example. Such heating environment is raised to an elevated temperature of approximately 400° C. to heat the sensing bodies during a heating cycle of 2 to 4 hours. Such timed procedure is cyclically repeated to achieve the desired reconditioning by use of an automatic cycling machine for example.

After reassembly of the treated dosimeters of the second groups, a reading of residual emission is taken therefrom as indicated at block 68 in FIG. 2B. Those dosimeters exhibiting a residual dosage reading greater than 37 Roentgens as denoted at block 70 are recycled through repetition of the treatment steps beginning with dismounting the sensing bodies denoted at block 58 as indicated in FIG. 2B while the other dosimeters exhibiting less than 37 Roentgens are collected together with those of the first group of reasembled dosimeters as indicated at block 30 diagrammed in FIG. 2.

The different treatment procedures 26 and 28 for the two groups of dosimeters are respectively terminated after application of the long-lasting moisture sealant to the exposure faces 12a and 12b of the sensing bodies of the dosimeters as denoted at block 42 and 64 of FIGS. 2A and 2B respectively. Examples of sealants suitable for the purpose include: a liquid product marketed as "FOG" by Mine Safety Appliance Co., of Pittsburgh, PA; a silicone resin coating spray, MS-460, marketed by Miller-Stephenson Co., of Danbury, CT; a spray, "NS Moisture Barrier", marketed by National American Sales Corp., of Thibodaux, LA, and a liquid product marketed as "Rain-X" by UNEKLO Corporation of Scottsdale, AZ.

Referring once again to FIG. 2B, a small fraction of the reassembled dosimeters, withdrawn from the second group, are irradiated with a highly accurate dose of gamma radiation as indicated at block 74 for the purpose of measuring emissions induced thereby as indicated at block 76 in the correction factor determination phase of the process. According to one embodiment, the small fraction of dosimeters irradiated is 0.2% of the original batch while the gamma radiation has an intensity of 100 Roentgens ($0.26 \times 10^{-1}$C/kg). Based thereon, a reading correction factor is calculated as indicated at block 78. It has been determined that the observed radiation dosage reading obtained from the treated dosimeters in actual use collected from the second group at 78, when multiplied by the calculated correction factor will provide the true exposure radiation dose reading calibrated to a standard such as cobalt 60. The ratio of observed to true exposure dose readings obtained was in the range of 0.85 to 0.95 for such embodiment of the invention investigated. A calculated correction of factor within a range of 1.176 to 1.052 was assigned to such second group of treated dosimeters after termination of operations as diagrammed in FIGS. 2A and 2B.

Numerous other modifications and variations of the present invention are possible in light of the foregoing teachings. It is therefore to be understood that within the scope of the appended claims the invention may be practiced otherwise than as specifically described.

What is claimed is:

1. A method of recycling dosimeters having bodies exposing sensing surfaces for emission of radiation therefrom in response to excitation by ultra-violet radiation following prior exposure to gamma radiation, including the steps of: visually inspecting the sensing surfaces on a batch of the dosimeters to detect observable surface degradation; separating a first group of the dosimeters from said batch exhibiting the observable surface degradation on the sensing surfaces thereof; irradiating the bodies of the remaining dosimeters of said batch with ultra-violet radiation; measuring the emissions from the remaining dosimeters induced by said latter ultra-violet irradiation; separating a second group of the dosimeters from the remaining dosimeters exhibiting readings of the measured emissions above a normal base; washing the sensing surfaces on the dosimeters of said first and second groups; heat treating the bodies of the dosimeters of the second group having the washed surfaces thereon; irradiating with gamma radiation a fraction of the dosimeters of the second group having the heat treated bodies; measuring emissions from said fraction of the dosimeters of the second group induced by the latter gamma irradiation to calculate a correction factor; measuring residual emissions from the dosimeters of the second group; repeating said steps of washing and heat treating the dosimeters of the second group having the measured residual emissions thereof greater than a standard residual dose reading; and applying a moisture sealant to the sensing surfaces on the dosimeters of said first and second groups to form reconditioned dosimeters to which said correction factor is assigned when subsequently reading radiation dosage.

2. The method of claim 1 including the further steps of: dismounting the sensing bodies from the dosimeters of said first and second groups prior to said washing of the sensing surfaces thereof; acid cleaning the washed surfaces in the bodies of the dosimeters of the first group; abrading the acid cleaned sensing surfaces of the dosimeters of said first group which continue to exhibit surface degradation; reassembling the dosimeters of said first group; and reassembling the dosimeters of the second group having the heat treated bodies prior to said step of gamma irradiation.

3. The method of claim 2 wherein said fraction of the dosimeters of the second group irradiated with the gamma radiation is approximately 0.2% of the batch.

4. The method of claim 3 wherein the gamma radiation has an intensity of approximately 100 Roentgens.

5. The method of claim 4 wherein said standard residual dose reading is approximately 37 Roentgens.

6. The method of claim 1 wherein said step of heat treating includes heating the bodies with the washed surfaces to an elevated temperature in a moisture-free gaseous atmosphere during repeated cycles of predetermined duration.

7. The method of claim 1 including the further steps of:
visually inspecting the sensing surfaces of the dosimeters of the first group after said step of washing thereof to extract the dosimeters with remaining surface degradation; acid cleaning the washed sensing surfaces of the extracted dosimeters, and abrading the acid cleaned sensing surfaces of the extracted dosimeters which continue to exhibit surface degradation to remove remaining degradation.

8. A method of reconditioning dosimeters which emit luminescent light in response to excitation of sensing surfaces thereon by ultra-violet radiation following prior exposure to gamma radiation, including the steps of: visually inspecting the sensing surfaces on a batch of the dosimeters to detect observable surface degradation; separating a first group of the dosimeters from said batch exhibiting the observable surface degradation on the sensing surfaces thereof; irradiating the sensing surfaces on the remaining dosimeters of said batch with ultra-violet radiation; measuring emissions from the remaining dosimeters of said batch induced by said latter ultra-violet irradiation; separating a second group of the dosimeters from the remaining dosimeters exhibiting readings of the measured emissions; washing the sensing surfaces on the dosimeters of said first and second groups; abrading the sensing surfaces on the dosimeters of the first group exhibiting surface degradation after said washing thereof; heat treating the dosimeters of the second group having the washed sensing surfaces; measuring residual emissions from the dosimeters of the second group having the heat treated sensing surfaces; recycling the heat treated dosimeters of the second group having the measured residual emissions thereof greater than a standard residual dose reading for repeated treatment by said steps of washing and heat treating; and applying a moisture sealant to the sensing surfaces on the dosimeters of the first and second groups to terminate the reconditioning of the dosimeters.

9. The method of claim 8 including the steps of dismounting the sensing surfaces from the dosimeters of the first and second groups prior to said washing thereof; reassembling the dosimeters of the first group having the washed sensing surfaces; reassembling the dosimeters of the second group having the heat treated sensing surfaces; and washing the abraded sensing surfaces after reassembly of the dosimeters of the first group.

10. The method of claim 9 wherein said standard residual dose reading is equal to or less than approximately 37 Roentgens.

11. The method of claim 9 wherein said step of heat treating includes heating the sensing surfaces to an elevated temperature in a moisture-free gaseous atmosphere during repeated cycles of predetermined duration.

12. The method of claim 8 wherein said step of heat treating includes heating the washed sensing surfaces to an elevated temperature in a moisture-free gaseous atmosphere during repeated cycles of predetermined duration.

13. A method of recycling dosimeters which emit luminescent light in response to excitation of sensing surfaces thereon by ulta-violet radiation following prior exposure to gamma radiation, including the steps of: visually inspecting the sensing surfaces on a batch of the dosimeters to detect observable surface degradation; separating a first group of the dosimeters from said batch exhibiting the observable surface degradation on the sensing surfaces thereof; irradiating the the remaining dosimeters of said batch with ultra-violet radiation; measuring emissions from the remaining dosimeters of said batch induced by said latter ultra-violet irradiation; separating a second group of the dosimeters from the remaining dosimeters exhibiting abnormal readings of the measured emissions; washing the sensing surfaces on the dosimeters of the first and second groups; abrading the sensing surfaces on the washed dosimeters of the first group to correct remaining surface degradation after said washing thereof; heat treating the dosimeters of the second group having the washed sensing surfaces; irradiating a fraction of the dosimeters of the second group having the heat treated sensing surfaces with gamma radiation; measuring emissions from said fraction of the dosimeters of the second group induced by the latter gamma irradiation to calculate a correction factor; measuring residual emissions from the dosimeters of the second group; and separating the dosimeters having the measured residual emissions thereof less than a standard residual dose reading to form with the dosimeters of the first group reconditioned dosimeters to which said correction factor is assigned when subsequently reading radiation dosage.

14. The method of claim 13 including the steps of: dismounting the sensing surfaces on the dosimeters of the first and second groups prior to said washing thereof; reassembling the dosimeters of the first group having the washed sensing surfaces; reassembling the dosimeters of the second group having the heat treated sensing surfaces prior to said step of gamma irradiation; and washing the abraded sensing surfaces on the dosimeters of the first group.

15. The method of claim 14 wherein said step of heat treating includes heating the washed sensing surfaces to an elevated temperature in a moisture-free gaseous atmosphere during repeated cycles of predetermined duration.

16. The method of claim 15 wherein said predetermined duration is between 2 and 4 hours.

17. In combination with the reconditioning of dosimeters which emit luminescent light in response to excitation by ultra-violet radiation after exposure to gamma radiation, by a method which includes corrective treatment of physically degraded sensing surfaces of the dosimeters and heat treatment of the dosimeters having sensing surfaces exhibiting abnormal emission intensities induced by ultra-violet radiation, the improvement residing in the steps of: dividing a batch of the dosimeters into separate reconditioned groups respectively subjected to said corrective treatment of the physically degraded sensing surfaces and said heat treatment of the dosimeters having the sensing surfaces thereof exhibiting the abnormal emission intensities; irradiating a predetermined fraction of said batch of the dosimeters from one of the separate groups with gamma radiation to measure emissions induced thereby; calculating a correction factor based on said measured emissions; and assigning said calculated correction factor to the dosimeters after the reconditioning thereof.

18. The improvement as defined in claim 17 including the further step of: applying moisture sealant to sensing surfaces of the dosimeters to terminate said reconditioning thereof.

19. The improvement as defined in claim 18 including the further steps of: measuring residual dosage of the dosimeters subjected to said heat treatment; and restricting said one of the separate groups of the dosimeters to those exhibiting a measured residual dosage less than a standard residual reading value.

20. The improvement as defined in claim 19 wherein said heat treatment includes sequential washing and drying.

21. The improvement as defined in claim 17 including the further steps of: measuring residual dosage of the dosimeters subjected to said heat treatment; and restricting said one of the separate reconditioned groups to the dosimeters exhibiting a measured residual dosage less than a standard residual reading value.

22. In combination with the reconditioning of dosimeters which emit luminescent light in response to excitation by ultra-violet radiation after exposure to gamma radiation, by a method which includes corrective treatment of physically degraded sensing surfaces of the dosimeters and heat treatment of the dosimeters having sensing surfaces exhibiting abnormal emission intensities induced by ultra-violet radiation, the improvement residing in the steps of: dividing a batch of the dosimeters into separate groups respectively subjected to said corrective treatment of the physically degraded sensing surfaces and said heat treatment of the dosimeters having the sensing surfaces thereof exhibiting the abnormal emission intensities; and applying moisture sealant to the sensing surfaces of the dosimeters to terminate said reconditioning thereof.

23. In combination with the reconditioning of dosimeters which emit luminescent light in response to excitation by ultra-violet radiation after exposure to gamma radiation, by a method which includes corrective treatment of physically degraded sensing surfaces of the dosimeters and heat treatment of the dosimeters having sensing surfaces exhibiting abnormal emission intensities induced by ultra-violet radiation, the improvement residing in the steps of: dividing a batch of the dosimeters into separate reconditioned groups respectively subjected to said corrective treatment of the physically degraded sensing surfaces and said heat treatment of the dosimeters having the sensing surfaces thereof exhibiting the abnormal emission intensities; measuring residual dosage of the dosimeters in one of the separate groups subjected to said heat treatment; and restricting said one of the separate reconditioned groups to the dosimeters exhibiting a measured residual dosage less than a standard residual reading value.

24. The improvement as defined in claim 23 wherein said heat treatment includes sequential washing and drying.

25. The method of claim 23 wherein said corrective treatment includes: cleaning the sensing surfaces on the dosimeters of the other of the separate groups with acid to remove surface contamination; and abrading the sensing surfaces after said cleaning thereof.

* * * * *